(12) United States Patent
Iwasaki

(10) Patent No.: US 6,788,472 B1
(45) Date of Patent: Sep. 7, 2004

(54) IMAGE PICKUP DEVICE

(75) Inventor: Masanori Iwasaki, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/265,860

(22) Filed: Mar. 11, 1999

(30) Foreign Application Priority Data

Mar. 17, 1998 (JP) .......................................... P10-065966

(51) Int. Cl.$^7$ ................................................. G02B 9/00

(52) U.S. Cl. ........................................ 359/654; 359/652

(58) Field of Search .................................. 359/654, 652

(56) References Cited

U.S. PATENT DOCUMENTS 6,130,787 A * 10/2000 Tsuchida .................... 359/654

* cited by examiner

Primary Examiner—David N. Spector
(74) Attorney, Agent, or Firm—Rader, Fishman & Grauer PLLC; Ronald P. Kananen

(57) ABSTRACT

In an image pickup device, a single refractive index distribution lens having a refractive index distribution which is substantially proportional to the square of the distance from an optical axis in a cross-section vertical to the optical axis is provided as an imaging lens in the neighborhood of the imaging face of an image pickup element. Specifically, the positional relationship between the image pickup element and the lens is fixed by adhesion of organic solvent or the like. Further, an infrared-ray cut filter is formed on the light incident face of the refractive index distribution lens.

7 Claims, 4 Drawing Sheets

1a

1b

1c

IMAGE PICKUP DEVICE

BACKGROUND OF THE INVENTION

1. Field of the Invention

The present invention relates to an image pickup device comprising an image pickup element and a lens for focusing an image onto the imaging face of the image pickup element.

2. Description of the Related Art

Recently, an image pickup device comprising a solid-state image pickup element and a lens for focusing an image onto the imaging face thereof has been applied to a camera. An optical lens having uniform refractive index is used as a lens for such an image pickup device as described above.

In the image pickup device using the lens having uniform refractive index, an optical distance which is extremely large although it is finite is required between the lens and the solid-state image pickup element in order to converge and focus image or refracted light beams onto the imaging face of the solid-state image pickup element. Accordingly, the sum of the thickness of the lens and the imaging distance is needed as the A optical distance between a first face (i.e., the face at the light incident side) of the lens and the imaging face of the solid-state image pickup element.

In the conventional image pickup device as described above, since the total of the lens thickness and the imaging distance is needed as the optical distance between the lens first face (i.e., the incident-side face) and the imaging face of the solid-state image pickup element, and thus it is very difficult to shorten the overall length of the optical system. Therefore, requirements of compact design for the image pickup device and the camera using it have never been satisfied.

According to the above-described conventional image pickup device, when a lens holder is used to secure a lens so as to be spaced from the image pickup element at a proper interval while a predetermined positional relationship is kept between the lens and the image pickup element, an error of the positional relationship between the lens and the lens holder and an error of the positional relationship between the lens holder and the solid-state image pickup element may occur as a fabrication error, and thus it is difficult to reduce the error.

SUMMARY OF THE INVENTION

The present invention has been implemented to overcome the problem of the conventional image pickup device, and has an object to more shorten the overall length of an image pickup device comprising a lens and an image pickup element, and reduce the error of the positional relationship between the lens and the image pickup element.

In order to attain the above object, an image pickup device according to the present invention is characterized in that a refractive index distribution lens having a refractive index distribution which is inversely proportional to the square of the distance from the optical axis in a cross-section vertical to the optical axis is provided as an imaging lens in the neighborhood of the imaging face of the image pickup element.

According to the image pickup device of the present invention, since the refractive index lens is used as the lens, an image at infinity which is incident as parallel rays of light from the end face of the lens incident side is imaged on the end face of the lens emission side when the length (thickness) of the lens is set to a meandering period $P=0.5\pi+n\pi$ ($n=0, 1, 2, \ldots$). Accordingly, the image is imaged on the imaging face of the image pickup element located in the neighborhood of the end face of the lens emission side, and thus it is unnecessary to set a large gap between the lens and the image pickup element. Therefore, the length of the optical system can be reduced, and the design of the image pickup device can be improved to be more compact in size and thinner in thickness.

Further, the lens can be provided in the neighborhood of the image pickup element, and thus the positional relationship between the image pickup element and the lens can be fixed by adhesion with organic solvent or the like, whereby an error factor causing the positional error of the lens to the image pickup element can be reduced and thus the positioning precision can be enhanced.

The image pickup device of the present invention is basically characterized in that a refractive index distribution lens having a refractive index distribution which is substantially proportional to the square of the distance from the optical axis in cross-section vertical to the optical axis is provided as an imaging lens in the neighborhood of the imaging face of an image pickup element. The lens length is preferably set to a meandering period $P=0.5\pi+n\pi$ ($n=0, 1, 2, \ldots$). Particularly, it is preferable that the lens length is as small as possible (for example, n=zero) because the lens length can be shortened.

The image pickup device of the present invention can be embodied in such a manner that the refractive index distribution lens and the image pickup element are held by a holder to regulate the positional relationship between the refractive index distribution lens and the image pickup element. However, it may be embodied in such a manner that the refractive index distribution lens is directly adhesively attached to the image pickup element. In this case, the positional relationship between the refractive index distribution lens and the image pickup element can be controlled with extremely high precision if a material which gives no adverse effect to the lens and the image pickup element is merely selected as the adhesive agent.

Further, an optical thin film for reflecting infrared rays may be provided at the light incident face of the refractive index distribution lens, or absorption means for absorbing infrared rays may be provided at the light incident face side of the refractive index distribution lens. With this structure, the infrared rays can be intercepted.

Further, a lens which is provided with a curvature at one end face side or both the end face sides thereof may be used as the refractive index distribution lens. In this case, the optical characteristic based on the refractive index distribution is varied by the curvature, and the combined optical characteristic of the optical characteristic based on the refractive index distribution and the optical characteristic based on the curvature becomes the optical characteristic of the lens. As described above, the present invention has various modes.

The "image pickup element" of the present invention means any member which can receive an image of rays of light from a subject and output the electrical signal corresponding to the image, such as a CCD (charge-coupled device), a CMOS image sensor or the like.

DETAILED DESCRIPTION OF THE PREFERRED EMBODIMENT

A preferred embodiment according to the present invention will be described hereunder with reference to the accompanying drawings.

Figure 1:
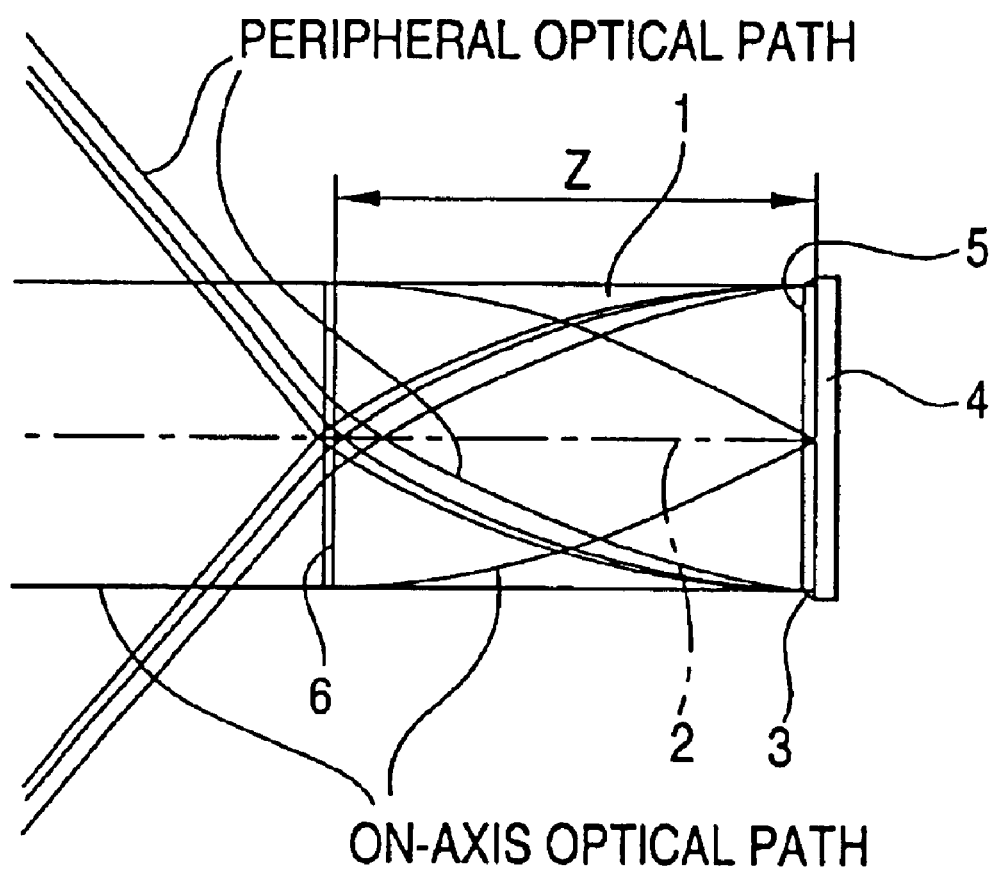
FIG. 1 is a cross-sectional view showing an embodiment of an image pickup device according to the present invention.

FIG. 1 is a cross-sectional view showing an embodiment of an image pickup device according to the present invention.

In FIG. 1, reference numeral 1 represents a refractive index distribution lens; the refractive index distribution lens 1 is designed in a cylindrical shape and has a refractive index distribution which is substantially proportional to the square of the distance from an optical axis 2 in a cross-section vertical to the optical axis 2. The refractive index distribution lens 1 adheres to an imaging face 5 of a solid-state image pickup element 4 at the end face of the light emission side thereof by thin and transparent adhesive agent 3 formed of organic solvent. Reference numeral 6 represents an infrared-ray cut filter film formed on the light incident face of the refractive index distribution lens 1, and the filter 6 is formed by deposition and serves to reflect infrared rays.

The lens length Z of the refractive index distribution lens 1 is expressed by the following equation when the refractive index distribution constant $\sqrt{A}=0.43$, the refractive index N on the optical axis (different from "n" in the equation expressing the meandering period P)=1.658 and the meandering period $P=0.5\pi$ (i.e., for n=0 in the equation of the meandering period P):

Z=meandering period P/refractive index distribution constant= $(0.5\pi)/\sqrt{A}=3.653$ mm.

In this case, the calculation is made under the condition that the thickness of the adhesive agent 3 is neglected, the emission-side end face of the refractive index distribution lens 1 is brought into direct contact with the imaging face and the existence of the infrared-rays cut filter 6 (thickness, characteristic) is neglected. In the above equation, A represents one of the focusing parameters. The lens diameter is set to 1.8 mm, and thus the refractive index distribution lens 1 of this embodiment is optimum to a ⅒-inch image pickup element 4. This is because the length of the diagonal line of the ⅒-inch image pickup element 4 is equal to 1.8 mm. That is, such a lens 1 is provided on a ⅒-inch image pickup element 4 to obtain an image of a diagonal view angle of 100 degrees. In addition, an infrared-ray image can be removed from the image thus obtained because the infrared-ray cut filter 6 is provided.

In FIG. 1, the on-axis optical path and the peripheral path are shown. Light beams on the on-axis optical path travel in parallel to the optical axis 2 of the lens 1 and are incident to the refractive index distribution lens 1. The incident light beams on the on-axis optical path are converged onto the end face of the emission side of the lens 1 or to a cross-point between the optical axis and the on-axis optical path behind the emission-side end face of the lens 1.

Figure 2:
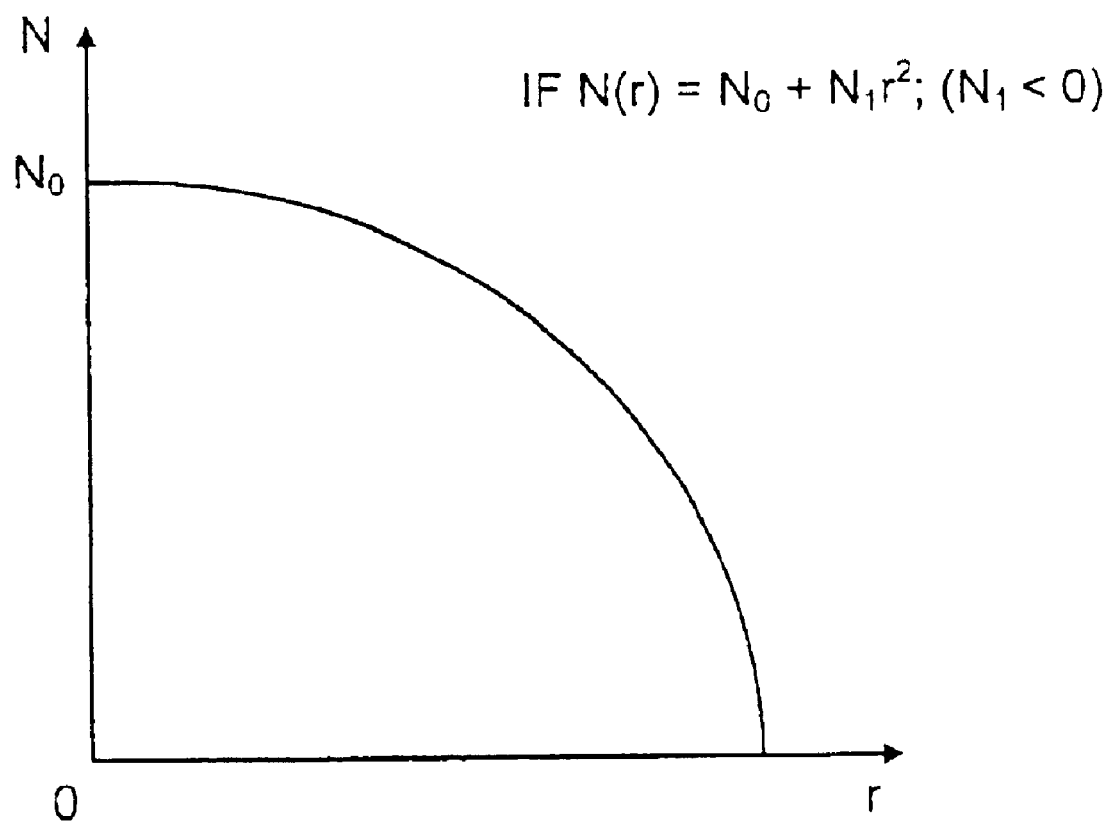
FIG. 2 is a diagram showing the overall shape of the refractive index distribution in relation to the cross-sectional area vertical to the optical axis.
Figure 3:
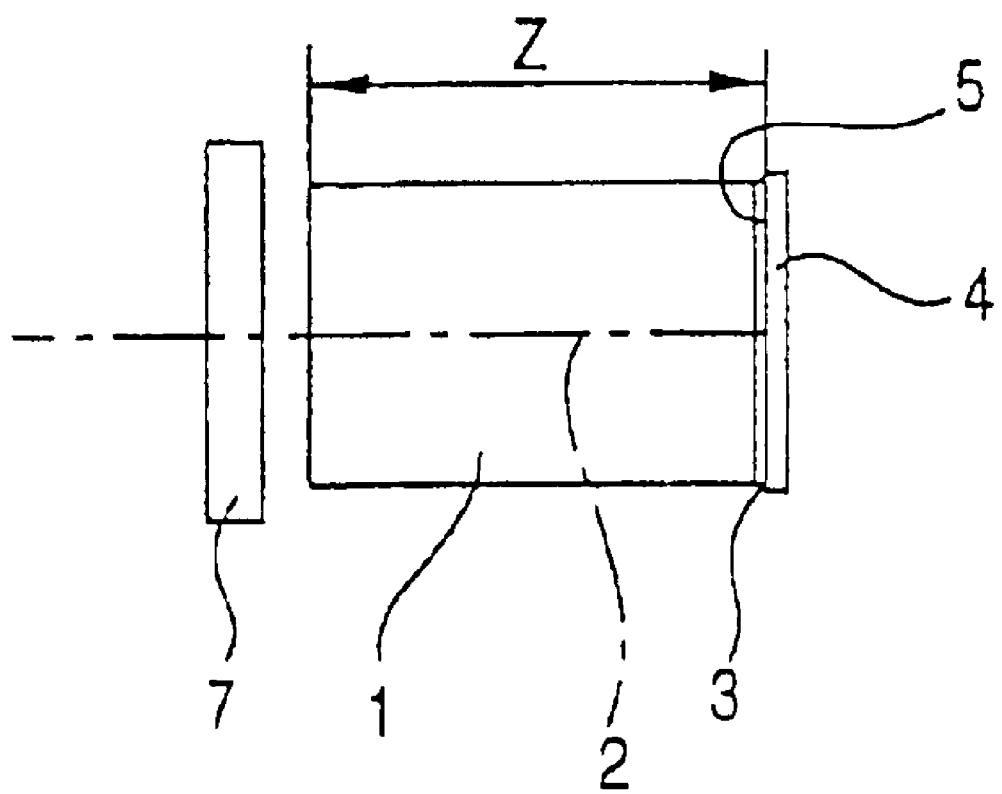
FIG. 3 is a cross-sectional view showing another embodiment of the image pickup device of the present invention.

FIG. 2 shows the overall shape of the refractive index distribution in relation to the cross-sectional area vertical to the optical axis.

The above-described image pickup device is an embodiment of the present invention, and the present invention may be embodied in various modes. First, in order to cut infrared rays, infrared rays may be reflected by an infrared-ray cut filter film 6, or an optical element 7 for absorbing infrared rays may be provided at the light incident face side of the refractive index distribution lens 1 to cut infrared rays as shown in FIG. 43.

Figure 4A:
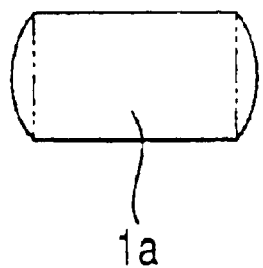
FIGS. 4A to 4C are cross-sectional views showing various modifications of a refractive index distribution lens of the image pickup device according to the present invention.
Figure 4B:
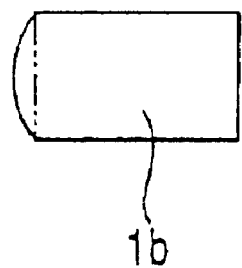
Figure 4C:
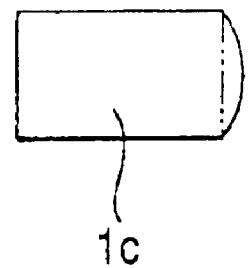

As shown in FIGS. 4A to 4C, a lens provided with the curvature at both or one of the light incident face and the light emission face thereof (as indicated by reference numerals 1a, 1b, 1c in FIGS. 4A to 4C) may be used as the refractive index distribution lens 1.

In this case, the combined optical characteristic of the optical characteristic based on the refractive index distribution and the optical characteristic based on the curvature becomes the characteristic of the refractive index distribution lens 1. That is, one or both of the end faces or surfaces of the refractive index distribution lens is provided with curvature, the lens effect can be also obtained by the curvature. Accordingly, the same lens effect can be achieved with a thinner refractive index distribution lens by the total effect of the lens effect based on the refractive index distribution and the lens effect based on the curvature. Accordingly, the more compact and thinner design of the image pickup device can be achieved.

According to the image pickup device of the first aspect of the present invention, a single refractive index distribution lens having a refractive index distribution which is substantially proportional to the square of the distance from the optical axis in a cross-section vertical to the optical axis is used as an imaging lens, so that an image at infinity which is incident from a lens incident-side end face as parallel rays of light are imaged or focused on the end face of the light emission side of the lens. Accordingly, the imaging face of the image pickup element can be positioned in the neighborhood of the refractive index distribution lens, and it is unnecessary to provide a gap between the lens and the image pickup element. Accordingly, the length of the optical system can be shortened, and the miniaturization of the image pickup device can be achieved.

Further, according to the image pickup device of the second aspect of the present invention, the refractive index distribution lens is adhesively attached in the neighborhood of the imaging face of the image pickup element by an adhesive agent, whereby the error factor in association with the positioning between the refractive index lens and the image pickup element is reduced and thus the positioning can be performed with extremely high precision.

According to the image pickup device of the third aspect of the present invention, the optical thin film for reflecting infrared rays is provided to the light incident face of the refractive index distribution lens, whereby infrared rays which are about to enter into the lens are reflected by the thin film to thereby prevent incidence of infrared rays into the image pickup element.

According to the image pickup device of the fourth aspect of the present invention, the optical element for absorbing infrared rays is provided to the light incident face side of the refractive index distribution lens, whereby infrared rays which are about to enter the lens are absorbed by the element to thereby prevent incidence of infrared rays into the image pickup element.

According to the image pickup device of the fifth aspect of the present invention, one or both of the end face or surfaces of the refractive index distribution lens is provided with curvature, and thus the lens effect can be also obtained by the curvature. Accordingly, the same lens effect can be obtained with a thinner refractive index distribution lens by the total effect of the lens effect based on the refractive index distribution and the lens effect based on the curvature. Accordingly, the more compact and thinner design can be performed on the image pickup device.

What is claimed is:

1. An image pickup device, characterized in that a refractive index distribution lens having a refractive index distribution which is inversely proportional to the square of the distance from the optical axis in a cross-section vertical to the optical axis is provided as an imaging lens in the neighborhood of an imaging face of an image pickup element.

2. The image pickup device as claimed in claim 1, wherein said refractive index distribution lens is adhesively attached to said imaging face of said image pickup element by adhesive agent.

3. The image pickup device as claimed in claim 1, wherein an optical thin film for reflecting infrared rays is provided on the light incident face of said refractive index distribution lens.

4. The image pickup device as claimed in claim 1, wherein infrared-ray absorption means for absorbing infrared rays is provided at the light incident face side of said refractive index distribution lens.

5. The image pickup device as claimed in claim 1, wherein curvature is provided to one or both of the surfaces of said refractive index distribution lens.

6. The image pickup device as claimed in claim 1, wherein said lens has a cylindrical shape having a light incident face at one end along said optical axis and said imaging face at said opposite end.

7. The image pickup device as claimed in claim 6, wherein curvature is provided to one or both end surfaces of said refractive index distribution lens.

* * * * *